(12) United States Patent
Dhanda et al.

(10) Patent No.: US 8,971,642 B2
(45) Date of Patent: Mar. 3, 2015

(54) TESTING THE RENDERING OF VISUAL CONTENT

(75) Inventors: Sanjeev Dhanda, San Francisco, CA (US); Yi Zhang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 232 days.

(21) Appl. No.: 13/456,826

(22) Filed: Apr. 26, 2012

(65) Prior Publication Data

US 2013/0287305 A1 Oct. 31, 2013

(51) Int. Cl.
*G06K 9/68* (2006.01)

(52) U.S. Cl.
USPC ............................ 382/218; 715/235; 715/234

(58) Field of Classification Search
CPC ..... H04L 67/02; G06F 17/30244; G06K 9/68
USPC .................................. 382/218; 715/235, 234
See application file for complete search history.

(56) References Cited

U.S. PATENT DOCUMENTS

| | | |
|---|---|---|
| 2003/0061283 A1 | 3/2003 | Dutta |
| 2004/0239703 A1 | 12/2004 | Angelica |
| 2006/0005114 A1 | 1/2006 | Williamson et al. |
| 2009/0265243 A1 | 10/2009 | Karassner et al. |
| 2010/0211893 A1 | 8/2010 | Fanning |
| 2010/0312821 A1 | 12/2010 | Bannoura |
| 2011/0078663 A1 | 3/2011 | Huang |
| 2011/0093773 A1* | 4/2011 | Yee ............................... 715/235 |
| 2011/0191178 A1 | 8/2011 | Newberg et al. |

OTHER PUBLICATIONS

Notification of Transmittal of the International Search Report and the Written Opinion of the International Search Authority, International Application No. PCT/US2013/038229, mailed Sep. 17, 2013, 11 pages.

* cited by examiner

*Primary Examiner* — Mike Rahmjoo
(74) *Attorney, Agent, or Firm* — Fish & Richardson P.C.

(57) ABSTRACT

Methods, systems, and apparatus for testing content rendering are described. A method includes receiving input specifying a change to a parameter relating to display of content in a webpage, in response to receiving the input, generating a test image of the webpage including the content, comparing a target image of the content with the generated test image to determine whether the generated test image includes the target image of the content, and selectively providing a failure notification based upon a result of the comparison.

27 Claims, 6 Drawing Sheets

TESTING THE RENDERING OF VISUAL CONTENT

BACKGROUND

This specification relates to testing the rendering of visual content, for example, on a display screen of a computer system.

Visual content may be rendered in many different environments. Different environments potentially encompass different operating systems, different browsers, different plugins, and/or different webpages. Different environments may support different standards. For example, one environment may use different font settings than another environment. Thus, adhering to the standards used by one environment may not be sufficient to ensure compatibility with another environment. In addition, as standards continue to evolve and change, environments also typically change to support new and modified standards.

A content item, such as an advertisement, may be rendered in different ways—e.g., to take on a different visual appearance—depending on the environment and on the parameters associated with the advertisement. Typically, to test the rendering of an advertisement, a test code is written in a coding language (e.g., Java script) for each different environment in which the advertisement is likely to be rendered. However, the test code for an advertisement typically is specific to particulars of the advertisement in its current state. If the advertisement is subsequently modified, the test code for that advertisement also ideally should be modified to test rendering of the modified advertisement in each of the different environments. Additionally, if an environment changes, the test code for that environment also may need to be updated.

SUMMARY

This specification describes technologies relating to testing the rendering of visual content, such as an advertisement, in multiple different environments and/or with multiple different feature sets. To test the rendering of a content item, a test file is created and rendered in an environment. A screenshot image of the rendering result is compared to a set of target images of the desired visual appearance of the advertisement.

In general, an innovative aspect of the subject matter described in this specification can be implemented in methods for testing advertisement rendering in multiple different environments and/or with multiple different feature sets. Methods for testing advertisement rendering may include receiving input specifying a change to a parameter relating to display of an advertisement in a webpage, in response to receiving the input, generating a test image of the webpage including the advertisement, comparing a target image of the advertisement with the generated test image to determine whether the generated test image includes the target image of the advertisement, and selectively providing a failure notification based upon a result of the comparison. Other potential implementations include corresponding system, apparatus, and/or computer programs configured to perform the actions of the methods, encoded on computer storage devices.

These and other implementations can optionally include one or more of the following features. The target image of the advertisement may represent a desired visual appearance of the advertisement. Receiving input specifying the change to the parameter can include receiving input specifying a change to one or more of the advertisement, the webpage, a browser, or an operating system. The generated test image of the webpage may include the target image of the advertisement when a number of pixels in the generated test image that matches a number of pixels in the target image is greater than a threshold number of pixels. Selectively providing the failure notification based upon the result of the comparison can include providing the failure notification when the result of the comparison indicates that the generated test image of the webpage does not include the target image of the advertisement. Selectively providing the failure notification can include notifying a user to review the generated test image of the webpage. The method can further include receiving input specifying that the generated test image of the webpage is acceptable to the user, and updating the target image of the advertisement with a portion of the webpage that includes the advertisement.

Particular implementations of the subject matter described in this specification may be implemented to realize one or more of the following potential advantages. Testing content item rendering by comparing images, as opposed to executing test code, simplifies the testing process because only one test file needs to be created for testing of the different environments and the different feature sets, as opposed to creating and maintaining test code for each of the different environments and each of the different feature sets. If the content item is later modified, the test file does not need to be updated.

Details of one or more implementations of the subject matter described in this specification are set forth in the accompanying drawings and description below. Other features, aspects, and potential advantages of the subject matter will become apparent from the description, the drawings, and the claims.

DETAILED DESCRIPTION

Various implementations described in this specification are discussed below in the context of testing advertisement rendering in multiple different environments. The technologies described in this specification may be used to test the rendering of other visual content in different environments and/or with different feature sets. For example, the techniques may be used to test the rendering of application displays and user interfaces in multiple different operating system environments. As another example, the techniques may be used to test the rendering of a webpage in multiple different browsers. As yet another example, the techniques may be used to test the rendering of web design templates in multiple different webpages. Accordingly, this specification describes implementations of the technologies for testing the rendering of visual content in multiple different environments and/or with different feature sets. Other implementations may include components different than those described herein.

Figure 1:
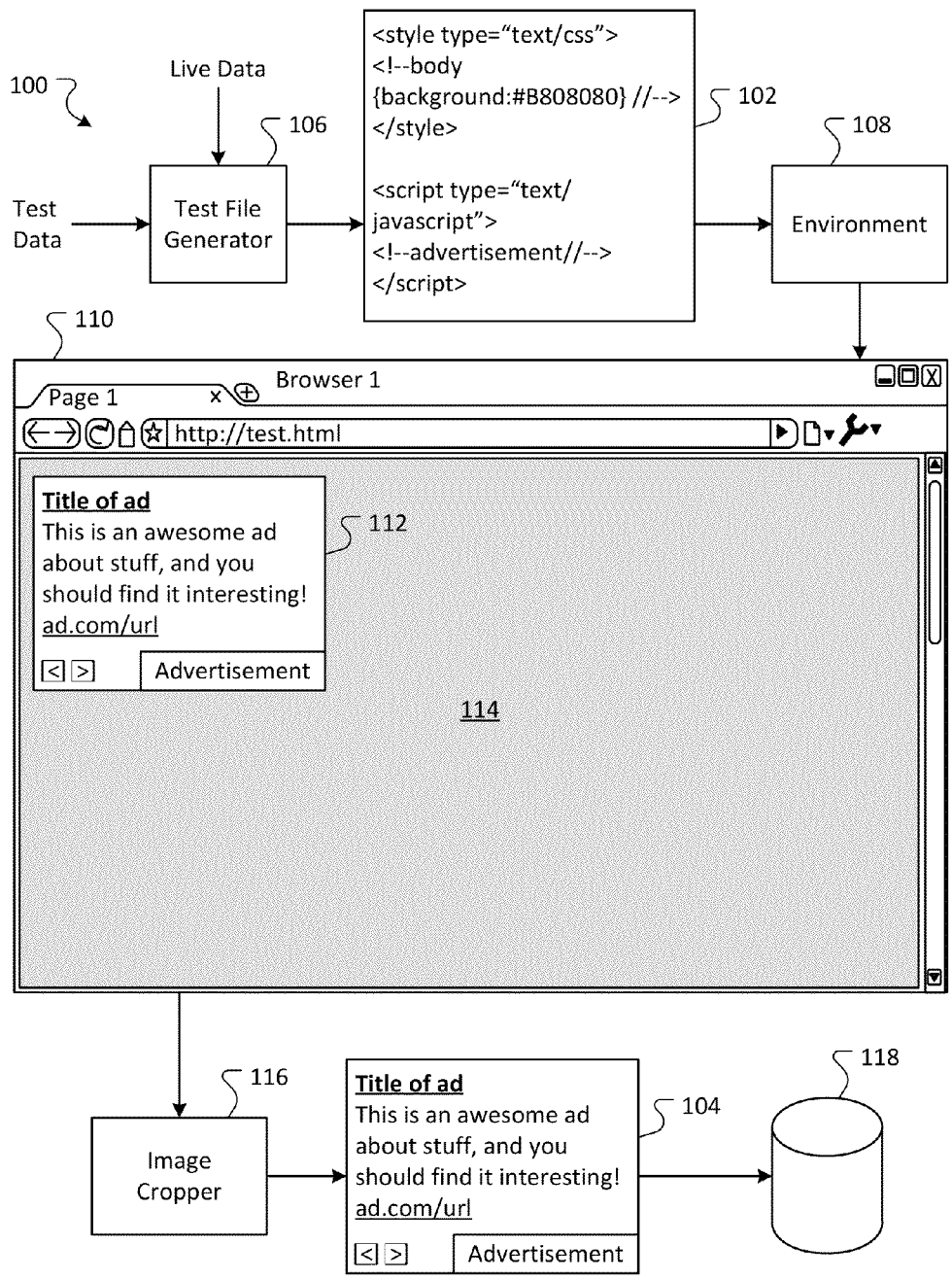
FIG. 1 is a diagram of an example system for creating a test file and a target image.

When testing advertisement rendering in multiple different environments, the initial set up may include creating a test file that includes an advertisement and creating a target image of the advertisement. FIG. 1 is a diagram of an example of a system 100 that may be used for creating a test file 102 and a target image. The test file 102 may be created using a test file generator 106. The test file generator 106 may be any suitable software application, such as a text editor, a hypertext markup language (HTML) editor, or a script editor. The test file generator 106 may be an application or a website that guides a user through the process of creating a test file 102 and a target image.

The test file generator 106 may receive test data for creating the test file 102. In some implementations, the test file generator 106 may receive user input for creating the test file 102. For example, the test file generator 106 may be a text editor in which a user may enter text to create the test file 102. In some implementations, the test file generator 106 may automatically generate the test file 102 based on predefined settings. For example, the test file generator 106 may execute a script to create the test file 102.

The test file generator 106 may receive live data from a live system for creating the test file 102. The test file generator 106 may merge the live data with the test data to create the test file 102. For example, the test file generator 106 may receive an advertisement from a live advertisement server and modify a set of fields of the advertisement specified by the test data. The test data may specify, for example, that the background color of the advertisement be a certain color, and the test file generator 106 modifies the background color of the advertisement as specified by the test data to create the test file 102. In this way, the rendering of an advertisement with different feature sets may be tested.

The test file 102 may be an HTML file that can be rendered in multiple different environments, such as different browsers running on different operating systems. The test file 102 may include an object defining an advertisement or a reference to an advertisement residing on a server. The test file 102 may define the location and/or size of the rendered advertisement in the browser. The test file 102 may include an element that defines a solid colored background, such as a black, gray, or white background.

The test file 102 is rendered in an environment 108, for example, a web browser running on an operating system. The system 100 captures a screenshot image 110 that shows the result of rendering test file 102 in the environment 108. The screenshot image 110 may be a full screen image of a web browser displaying the rendered test file 102. The screenshot image 110 includes an advertisement 112 against a solid colored background 114.

The screenshot image 110 may be processed by an image cropper 116 that crops the screenshot image 110 to generate an advertisement image 104. The advertisement image 104 includes only an image of the advertisement 112.

In some implementations, the image cropper 116 may scan the screenshot image 110 for large contiguous blocks of pixels that are the same color. In some implementations, the image cropper 116 may scan the screenshot image 110 for pixels that are the same color as the solid colored background defined by the test file 102. The image cropper 116 may crop from the outer edges of the screenshot image 110 until all of the pixels of the background are removed from the screenshot image 110 and only the advertisement image 104 remains.

In some implementations, the image cropper 116 may scan the screenshot image 110 for background areas, as described above, and mark the remaining areas as a possible advertisement. The image cropper 116 may mark a remaining area by generating a box around the pixels of the remaining area. The image cropper 116 compares the size of each remaining area with a threshold size. The threshold size may be the minimum size of an advertisement. A remaining area that meets or exceeds the threshold size is cropped from the screenshot image 110 and used as the advertisement image 104.

In some implementations, the image cropper 116 may compare the screenshot image 110 with a screenshot image of only the solid colored background rendered in the environment 108. The image cropper 116 may compare the two screenshot images pixel-by-pixel and remove the pixels that are the same in both images. The pixels that remain define the advertisement image 104.

For quality control, a human user can optionally review the advertisement image 104 for errors in the content of the advertisement 112 or errors in the advertisement code that is rendered to display the advertisement 112. If the user finds an error, the user can modify the content of the advertisement or the advertisement code to correct the error. After the user corrects the error, another advertisement image 104 is generated. When the user is satisfied with the visual appearance of the advertisement image 104, the advertisement image 104 is saved as the target image in a memory 118.

In some implementations, the advertisement image 104 may be saved as the target image without first being reviewed by a user. The target image represents the desired visual appearance of the advertisement 112 rendered in the particular environment 108. The target image may also represent the desired visual appearance of the advertisement 112 rendered in multiple different environments.

The test file 102 may be rendered in a subset of the possible environments to generate a set of target images for multiple different environments. Each target image in the set of target images may have a different visual appearance depending on the environment in which the test file 102 was rendered. In such a case, a target image represents the desired visual appearance of the advertisement as rendered in that particular environment.

Figure 2:
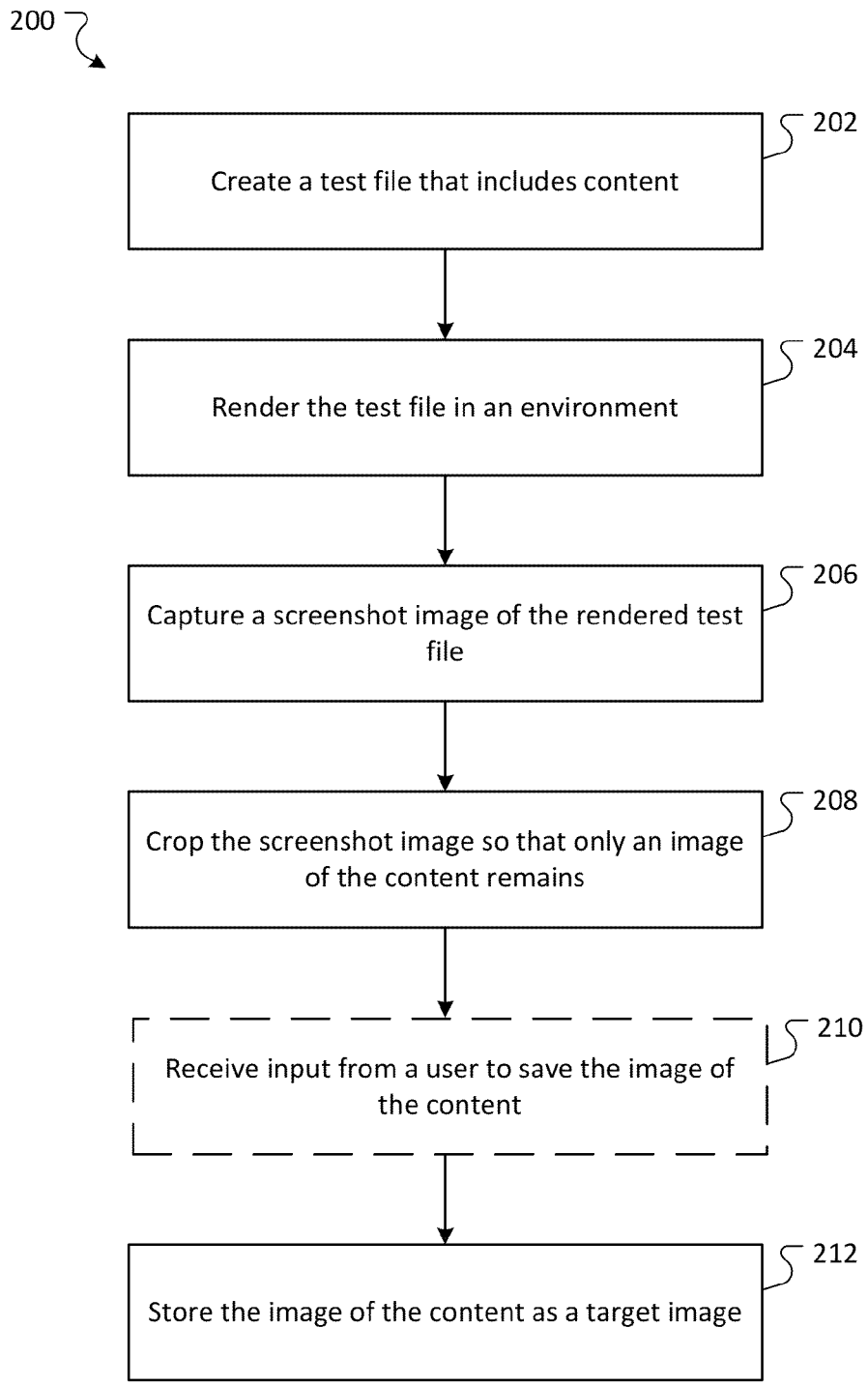
FIG. 2 is a flowchart of an example process for creating a target image.

FIG. 2 is a flowchart of an example process 200 for creating a target image. Briefly, the process 200 includes creating a test file that includes an advertisement, rendering the test file in an environment, capturing a screenshot image of the rendered test file, cropping the screenshot image so that only an image of the advertisement remains, and storing the advertisement image as a target image.

In further detail, the process 200 begins with creating a test file that includes an advertisement (202). The test file may be an HTML file that can be rendered in multiple different environments, such as different browsers running on different operating systems. The test file may include an object defining an advertisement or a reference to an advertisement residing on a server. The test file may define the location and/or size of the rendered advertisement in the browser. The test file may include an element that defines a solid colored background, such as a black, gray, or white background.

The test file is rendered in an environment (204). An environment may include an operating system, an application, a browser, a webpage, or other environments or combination of environments that are capable of rendering the test file. For example, an environment may be a webpage rendered by a browser running on an operating system.

A screenshot image of the rendered test file is captured (206). The screenshot image shows the result of rendering the test file in the environment. The screenshot image may be a full screen image of a web browser displaying the rendered test file. The screenshot image includes an advertisement against a solid colored background.

The screenshot image is cropped so that only an image of the advertisement remains (208). In some implementations, the portions of the screenshot image that do not include the advertisement is identified and removed so that only an image of the advertisement remains. For example, the browser window and the background color are identified and removed from the screenshot image. In some implementations, the portion of the screenshot image that includes the advertisement is identified and the remaining portions of the screenshot image are removed. For example, the boundary pixels of the advertisement are identified, and pixels outside of the boundary pixels are removed.

Optionally, input from a user to save the advertisement image is received via a user interface (210). The user interface may display the advertisement image and include options for the user to save the advertisement image or discard the advertisement image. The user may review the advertisement image via the user interface, and if the user is satisfied with the visual appearance of the advertisement image, the user may indicate via the user interface that the advertisement image is to be saved as a target image.

The image of the advertisement is stored as a target image (212). The target image represents the desired visual appearance of the advertisement rendered in the particular environment. The target image may also represent the desired visual appearance of the advertisement rendered in multiple different environments.

The process 200 may be repeated to generate a set of target images for a subset of the possible environments by rendering the test file in the subset of the possible environments. Each target image in the set of target images may have a different visual appearance depending on the environment in which the test file was rendered. In such a case, a target image represents the desired visual appearance of the advertisement as rendered in that particular environment.

Once a target image or a set of target images is created, the test file may be rendered in the same environment or a different environment. The test file may be rendered in the same environment to test the rendering of the advertisement with different feature sets or after a content modification or an ad code modification to ensure that the advertisement is visually consistent between different versions of the advertisement. The test file may be rendered in a different environment to ensure that the advertisement is visually consistent between the different environments.

Figure 3:
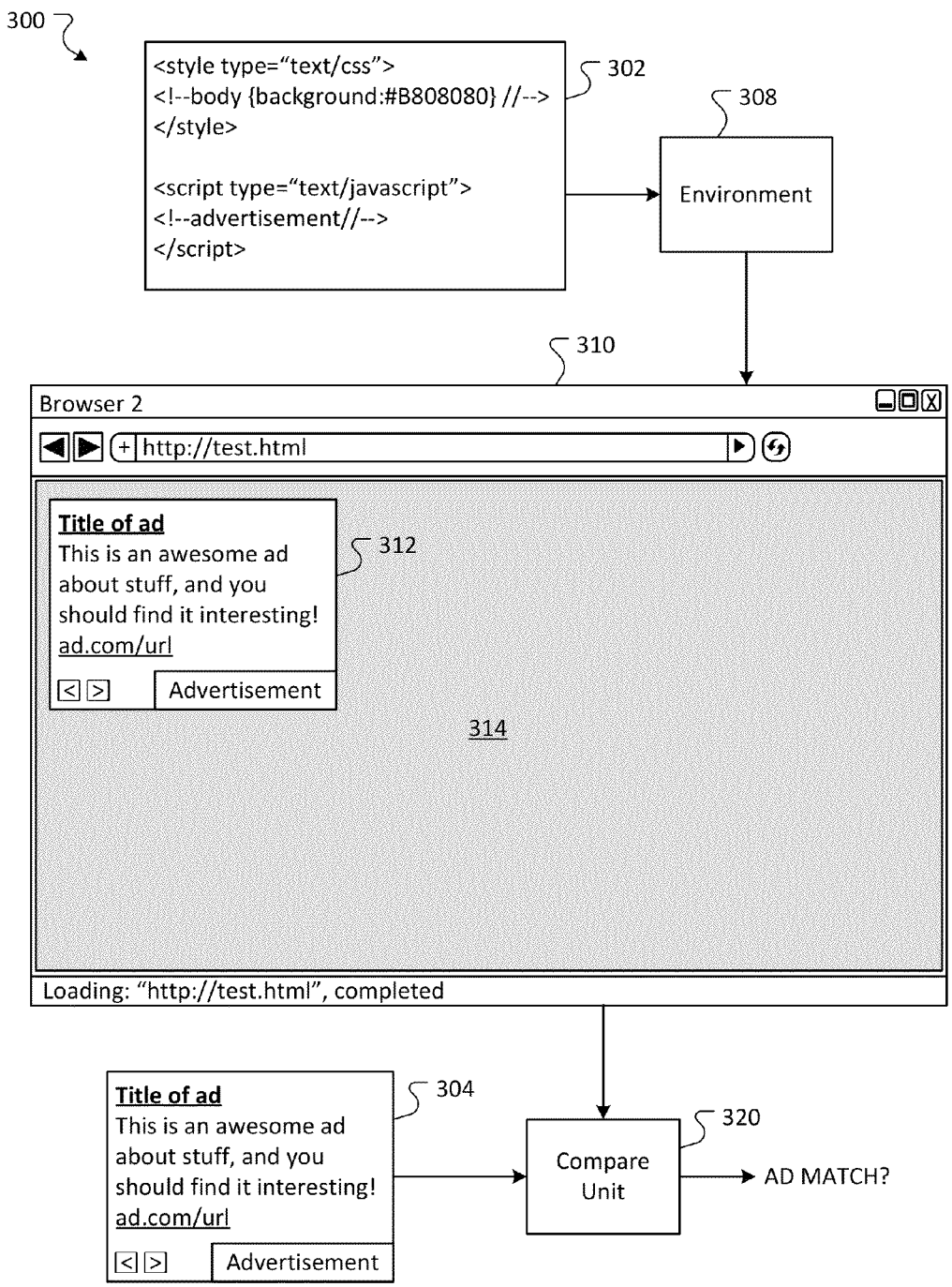
FIG. 3 is a diagram of an example system for testing the rendering of a content item.

FIG. 3 is a diagram of an example system 300 for testing the rendering of an advertisement in an environment 308. The test file 302 may be the same test file as the test file 102 of FIG. 1, or a different test file. The test file 302 may be an HTML file that can be rendered in multiple different environments, such as an HTML file of a webpage that can be rendered by different browsers running on different operating systems. The test file 302 may include an object defining an advertisement or a reference to an advertisement residing on a server. The test file 302 may define the location and/or size of the rendered advertisement in the browser. The test file 302 may include an element that defines a solid colored background, such as a black, gray, or white background.

The test file 302 is rendered in an environment 308, for example, a web browser running on an operating system. In some implementations, the environment 308 may be the same environment as the environment 108 of FIG. 1. The test file 302 may be rendered in the same environment to test the rendering of the advertisement with different feature sets or after a modification to a parameter relating to display of the advertisement.

The features of an advertisement can include a background of the advertisement, a background image, text font, text size, text justification, text color, title of the advertisement, text in the advertisement, hyperlink in the advertisement, size of the advertisement, and the like. The features may be received from a live system, from data input by a user, or from a combination of data received from a live system and input by a user. The features of the advertisement can be changed to test the rendering of the advertisement with different feature sets.

Examples of a modification to a parameter relating to display of the advertisement can include a modification to the advertisement, a webpage, a browser, an operating system, or other environment variable. For example, the test file 302 may be rendered to test the rendering of the advertisement after a content modification or an advertisement code modification to ensure that the advertisement is visually consistent between different versions of the advertisement. In some implementations, the environment 308 may be a different environment than the environment 108 of FIG. 1. The test file 302 may be rendered in a different environment to ensure that the advertisement is visually consistent between different environments.

The system 300 generates a test image 310, e.g., a screenshot image, that shows the result of rendering the test file 302 in the environment 308. The test image 310 may be a full screen image of a web browser displaying the rendered test file 302. The test image 310 includes an advertisement 312 against a solid colored background 314.

The test image 310 may be processed by a compare unit 320 to identify the advertisement 312 in the test image 310 and determine whether the advertisement 312 is visually consistent with a target image 304. The compare unit 320 may compare portions of the test image 310 that are the same size as the target image 304 with the target image 304.

Figure 4:
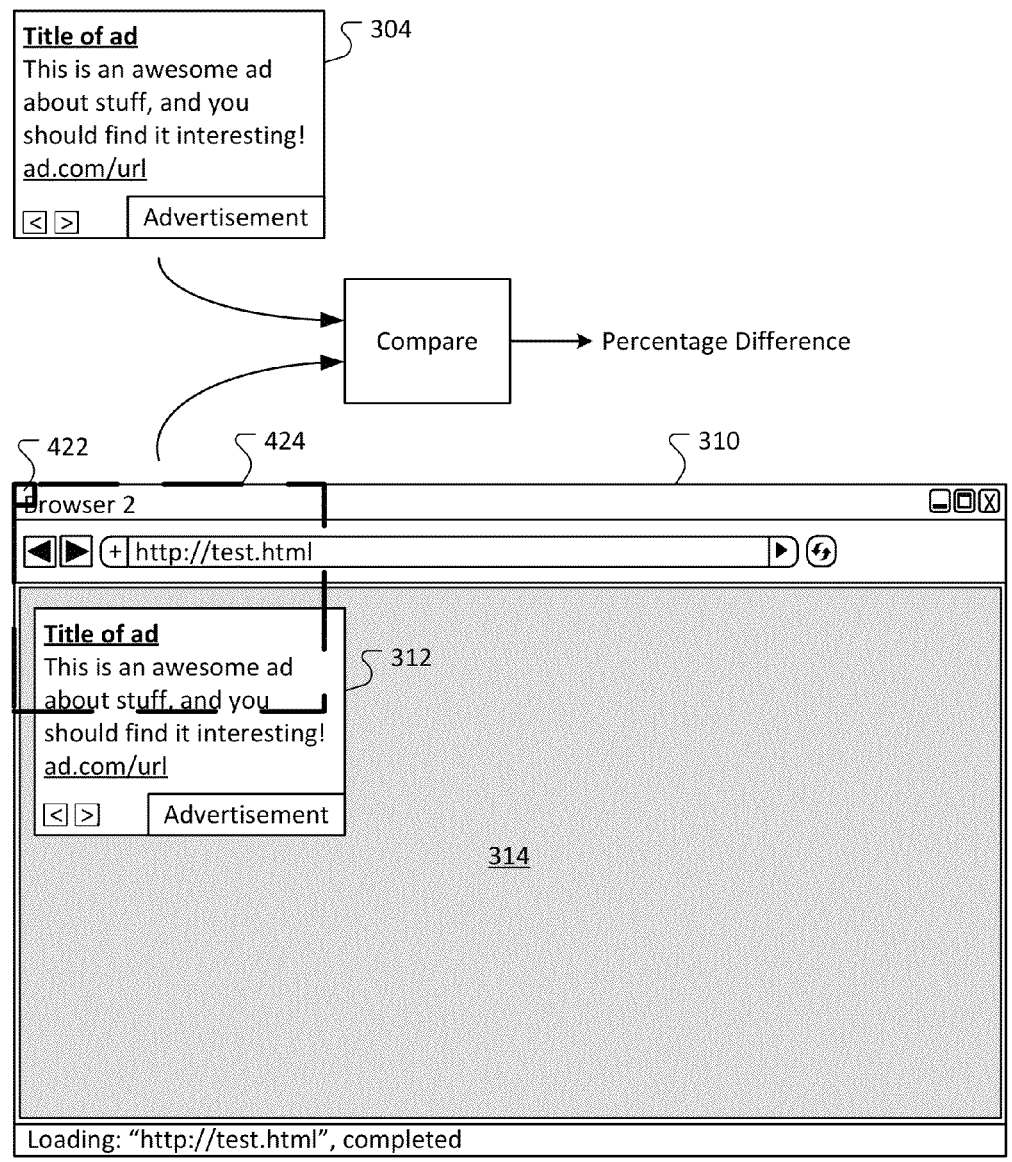
FIG. 4 illustrates a comparison of a portion of a screenshot image with a target image.

For example, FIG. 4 illustrates a comparison of a portion of the test image 310 with the target image 304. The compare unit 320 may select the first pixel 422 in the upper left hand corner of the test image 310. Using the selected pixel as the first pixel 422 in the first column and the first row of a sub-matrix, the compare unit 320 identifies a sub-matrix 424 of pixels having the size of the target image 304. Beginning with the selected pixel 422, the compare unit 320 compares the pixels of the sub-matrix 424 with the pixels of the target image 304. The compare unit 320 performs a pixel-by-pixel comparison of the pixels of the sub-matrix 424 and the pixels of the target image 304. The compare unit 320 determines an amount of difference between the pixels of the sub-matrix 424 and the pixels of the target image 304. The amount of difference is the ratio of the number of pixels that are different between the sub-matrix and the target image 304 to the number of pixels in the target image 304. From the amount of difference, the compare unit 320 may compute a percentage difference for the sub-matrix 424.

The compare unit 320 may compare all possible sub-matrices of the test image 310 with the target image 304 and compute a percentage difference for each of the possible sub-matrices. The compare unit 320 identifies the sub-matrix having the smallest percentage difference as a possible image of the advertisement 312. The compare unit 320 determines whether the percentage difference of the identified sub-image is less than a threshold percentage difference.

If the percentage difference of the identified sub-image is less than or equal to the threshold percentage difference, the compare unit 320 determines that the identified sub-image matches the target image 304. The system 300 may store the identified sub-image as a target image in a set of target images.

If the percentage difference of the identified sub-image is greater than the threshold percentage difference, the compare unit 320 determines that the test image 310 does not include a sub-image that matches the target image 304. The compare unit 320 may select a different target image in a set of target images to use in identifying the advertisement 312 in the test image 310.

If the compare unit 320 cannot identify the advertisement 312 in the test image 310 using any of the target images in the set of target images, the system 300 may notify a user that the test image 310 does not include a sub-image that matches a target image. The system 300 may display to the user a sub-image that has the smallest percentage difference. The user can review the sub-image for visual inconsistencies between the sub-image and a desired visual appearance of the advertisement. If the inconsistencies are acceptable to the user, the user may indicate via a user interface that the sub-image is to be saved as a target image in the set of target images, or that the sub-image is to replace a target image.

Figure 5:
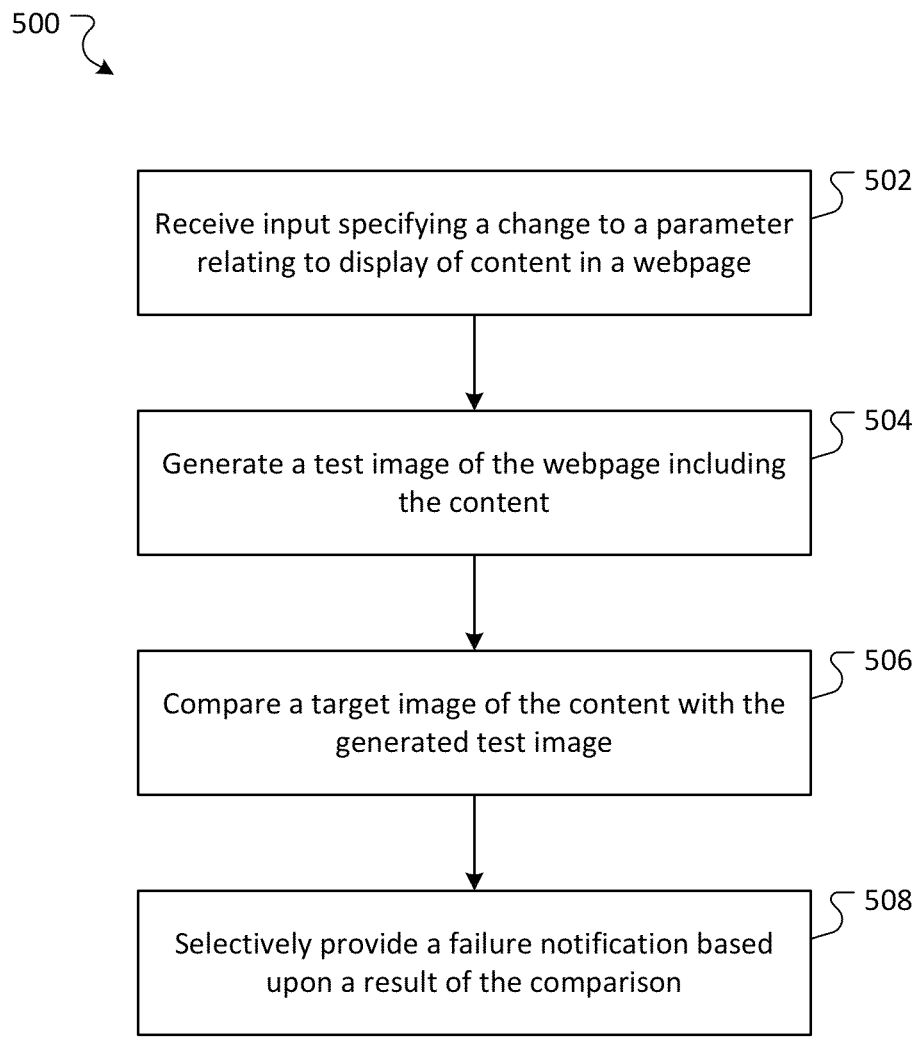
FIG. 5 is a flowchart of an example process for testing the rendering of a content item.

FIG. 5 is a flowchart of an example process 500 for testing the rendering of an advertisement after a modification is made relating to display of the advertisement. Briefly, the process 500 includes receiving input specifying a change to a parameter relating to display of an advertisement in a webpage, generating a test image of the webpage including the advertisement, comparing a target image of the advertisement with the generated test image, and selectively providing a failure notification based upon a result of the comparison.

In further detail, the process 500 begins with receiving input specifying a change to a parameter relating to display of the advertisement (502). The change to a parameter may be a change to the advertisement, the webpage that includes the advertisement, a browser that renders the webpage, an operating system that supports the browser, or other environment. In some implementations, the input may be received from a user who is making the change to the parameter. In some implementations, the input may be received from a system that detects that a change has been made to a parameter relating to display of the advertisement.

In response to receiving the input, a test image of the webpage including the advertisement is generated (504). The test image of the webpage may be a screenshot image of the webpage. The test image shows the result of rendering the webpage that includes the advertisement in, for example, a web browser. The test image may be a full screen image of a web browser displaying the webpage.

A target image of the advertisement is compared with the generated test image to determine whether the generated test image includes the target image of the advertisement (506). The target image represents the desired visual appearance of the advertisement. The generated test image of the webpage includes the target image of the advertisement when a number of pixels in the generated test image that matches a number of pixels in the target image is greater than a threshold number of pixels.

To determine whether the generated test image includes the target image of the advertisement, portions of the test image may be compared to the target image to identify a sub-image that matches the target image. Portions of the test image, e.g., sub-matrices, having the same size as the target image is compared to the target image. A pixel-by-pixel comparison of the pixels in a sub-matrix against the pixels of the target image is performed. A percentage difference between the sub-matrix and the target image is computed. After the percentage differences for all possible sub-matrices are computed, the sub-matrix with the smallest percentage difference is identified. The percentage difference is compared to a threshold percentage difference. The generated test image of the webpage includes the target image of the advertisement if the percentage difference is less than the threshold percentage difference.

A failure notification is selectively provided based upon a result of the comparison (508). If the result of the comparison indicates that the generated test image of the webpage includes the target image of the advertisement, no failure notification is provided. Optionally, a portion of the test image that includes the advertisement may be stored as a target image in a set of target images.

If the result of the comparison indicates that the generated test image of the webpage does not include the target image of the advertisement, a failure notification is provided. The test image may be displayed along with the notification. The user may be notified to review the test image of the webpage. The user can review the test image for visual inconsistencies between the target image of the advertisement and the advertisement that is included in the test image. If the inconsistencies are acceptable to the user, the user may indicate via a user interface that a portion of the test image that includes the advertisement is to be saved as a target image in the set of target images, or is to replace the target image.

In addition to testing the rendering of visual content on a display of a computer screen, the subject matter and the operations described in this specification can be used in any suitable manner. For example, a target image of a button may be used as described in this specification to locate the button in a rendered webpage and activate the button. As another example, a target image of certain content may be used as described in this specification to ensure that the content is not being displayed on a webpage, e.g., after a user logs out from the website. In this case, a failure notification may be provided if a result of the comparison indicates that the generated test image of the webpage includes the target image of the content. Thus, the subject matter and the operations described in this specification are not limited to testing the rendering of advertisements.

Implementations of the subject matter and the operations described in this specification can be configured in digital electronic circuitry, or in computer software, firmware, or hardware, including the structures disclosed in this specification and their structural equivalents, or in combinations of one or more of them. Implementations of the subject matter described in this specification can be configured as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 6:
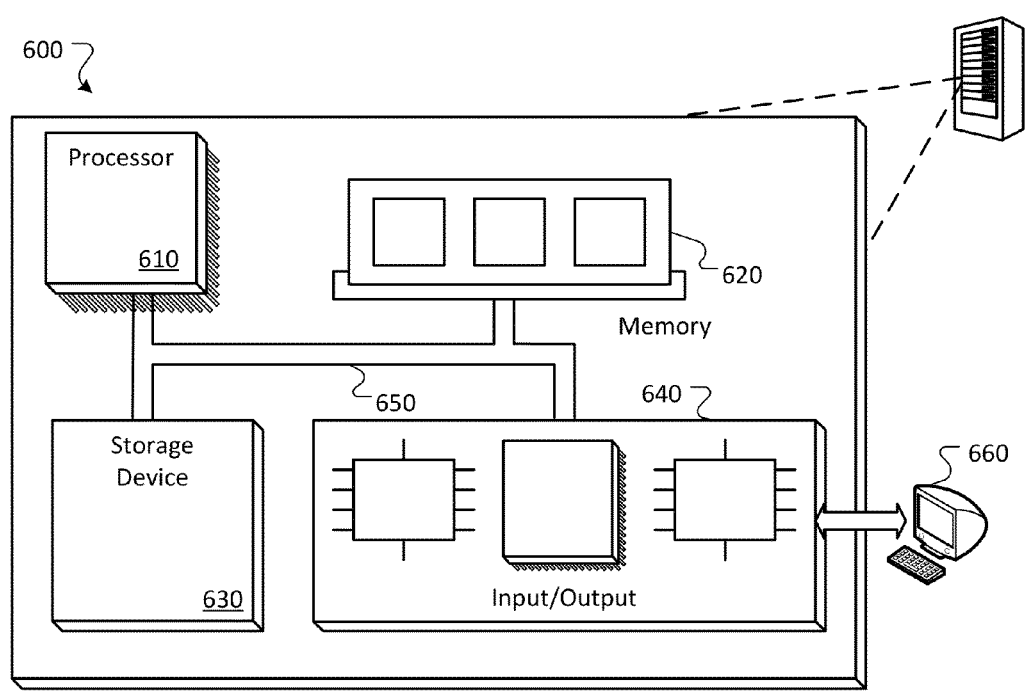
FIG. 6 is a block diagram of a programmable processing system.

An example of one such type of computer is shown in FIG. 6, which shows a block diagram of a programmable processing system (system). The system 600 that can be utilized to implement the systems and methods described herein. The architecture of the system 600 can, for example, be used to implement a computer client, a computer server, or some other computer device.

The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 660.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   receiving input specifying a change to a parameter relating to display of a visual content in a webpage;
   in response to receiving the input, generating a test image of the webpage including the visual content, wherein the test image of the webpage represents a visual appearance of the webpage as displayed to a user of a client device;
   comparing the generated test image with a predetermined target image of the visual content to determine whether the visual content included in the generated test image is visually consistent with the predetermined target image of the visual content, wherein the predetermined target image of the visual content represents an expected visual appearance of the visual content as displayed to the user of the client device, and the predetermined target image is stored in a repository; and
   selectively providing a failure notification based upon a result of the comparison;
   wherein comparing the generated test image with the predetermined target image of the visual content comprises:
      selecting a plurality of different portions of the generated test image, where each portion has a same size as the predetermined target image,
      determining, for each portion, a difference for the portion by comparing pixels of the portion with pixels of the predetermined target image,
      identifying a portion of the plurality of different portions having a smallest difference, and
      determining whether the smallest difference of the portion is smaller than a threshold difference;
   wherein the visual content included in the generated test image of the webpage is determined to be visually consistent with the predetermined target image of the visual content when the smallest difference for the portion is smaller than the threshold difference.

2. The method of claim 1, wherein the visual content comprises an advertisement.

3. The method of claim 1, wherein receiving input specifying the change to the parameter comprises:
   receiving input specifying a change to one or more of the visual content, the webpage, a browser, or an operating system.

4. The method of claim 1, wherein the visual content included in the generated test image of the webpage is determined to be visually consistent with the predetermined target image of the visual content when a number of pixels in the generated test image that match pixels in the predetermined target image is greater than a threshold number of pixels.

5. The method of claim 1, wherein selectively providing the failure notification based upon the result of the comparison comprises:
   providing the failure notification when the result of the comparison indicates that the visual content included in the generated test image of the webpage is not visually consistent with the predetermined target image of the visual content.

6. The method of claim 1, wherein selectively providing the failure notification comprises:
   notifying the user to review the generated test image of the webpage, and
   the method further comprises:
      receiving input specifying that the generated test image of the webpage is acceptable to the user; and
      updating the predetermined target image of the visual content with a portion of the webpage that includes the visual content.

7. The method of claim 1, further comprising:
   generating the predetermined target image of the visual content based on live data received from a live system.

8. The method of claim 1, wherein the predetermined target image of the visual content includes only the visual content without including other portions of the webpage.

9. The method of claim 1, wherein comparing the generated test image with a predetermined target image of the visual content comprises:

comparing pixels of the generated test image with pixels of the predetermined target image.

10. A non-transitory computer storage medium encoded with instructions that when executed by a client device cause the client device to perform operations comprising:
   receiving input specifying a change to a parameter relating to display of a visual content in a webpage;
   in response to receiving the input, generating a test image of the webpage including the visual content, wherein the test image of the webpage represents a visual appearance of the webpage as displayed to a user of the client device;
   comparing the generated test image with a predetermined target image of the visual content to determine whether the visual content included in the generated test image is visually consistent with the predetermined target image of the visual content, wherein the predetermined target image of the visual content represents an expected visual appearance of the visual content as displayed to the user of the client device, and the predetermined target image is stored in a repository; and
   selectively providing a failure notification based upon a result of the comparison;
   wherein comparing the generated test image with a predetermined target image of the visual content comprises:
      selecting a plurality of different portions of the generated test image, where each portion has a same size as the predetermined target image,
      determining, for each portion, a difference for the portion by comparing pixels of the portion with pixels of the predetermined target image,
      identifying a portion of the plurality of different portions having a smallest difference, and
      determining whether the smallest difference of the portion is smaller than a threshold difference;
   wherein the visual content included in the generated test image of the webpage is determined to be visually consistent with the predetermined target image of the visual content when the smallest difference for the portion is smaller than the threshold difference.

11. The non-transitory computer storage medium of claim 10, wherein the visual content comprises an advertisement.

12. The non-transitory computer storage medium of claim 10, wherein receiving input specifying the change to the parameter comprises:
   receiving input specifying a change to one or more of the visual content, the webpage, a browser, or an operating system.

13. The non-transitory computer storage medium of claim 10, wherein the visual content included in the generated test image of the webpage is determined to be visually consistent with the predetermined target image of the visual content when a number of pixels in the generated test image that match pixels in the predetermined target image is greater than a threshold number of pixels.

14. The non-transitory computer storage medium of claim 10, wherein selectively providing the failure notification based upon the result of the comparison comprises:
   providing the failure notification when the result of the comparison indicates that the visual content included in the generated test image of the webpage is not visually consistent with the predetermined target image of the visual content.

15. The non-transitory computer storage medium of claim 10, wherein selectively providing the failure notification comprises:
   notifying the user to review the generated test image of the webpage, and
   wherein the operations further comprise:
      receiving input specifying that the generated test image of the webpage is acceptable to the user; and
      updating the predetermined target image of the visual content with a portion of the webpage that includes the visual content.

16. The non-transitory computer storage medium of claim 10, further comprising:
   generating the predetermined target image of the visual content based on live data received from a live system.

17. The non-transitory computer storage medium of claim 10, wherein the predetermined target image of the visual content includes only the visual content without including other portions of the webpage.

18. The non-transitory computer storage medium of claim 10, wherein comparing the generated test image with a predetermined target image of the visual content comprises:
   comparing pixels of the generated test image with pixels of the predetermined target image.

19. A system, comprising:
   a data processing apparatus; and
   a non-transitory computer storage medium encoded with instructions that when executed by a client device cause the client device to perform operations comprising:
      receiving input specifying a change to a parameter relating to display of a visual content in a webpage;
      in response to receiving the input, generating a test image of the webpage including the visual content, wherein the test image of the webpage represents a visual appearance of the webpage as displayed to a user of the client device;
      comparing the generated test image with a predetermined target image of the visual content to determine whether the visual content included in the generated test image is visually consistent with the predetermined target image of the visual content, wherein the predetermined target image of the visual content represents an expected visual appearance of the visual content as displayed to the user of the client device, and the predetermined target image is stored in a repository; and
      selectively providing a failure notification based upon a result of the comparison;
   wherein comparing the generated test image with a predetermined target image of the visual content comprises:
      selecting a plurality of different portions of the generated test image, wherein each portion has a same size as the predetermined target image;
      determining, for each portion, a difference for the portion by comparing pixels of the portion with pixels of the predetermined target image;
      identifying a portion of the plurality of different portions having a smallest difference; and
      determining whether the smallest difference of the portion is smaller than a threshold difference;
   wherein the visual content included in the generated test image of the webpage is determined to be visually consistent with the predetermined target image of the visual content when the smallest difference for the portion is smaller than the threshold difference.

20. The system of claim 19, wherein the visual content comprises an advertisement.

21. The system of claim 19, wherein receiving input specifying the change to the parameter comprises:

receiving input specifying a change to one or more of the visual content, the webpage, a browser, or an operating system.

22. The system of claim 19, wherein the visual content included in the generated test image of the webpage is determined to be visually consistent with the predetermined target image of the visual content when a number of pixels in the generated test image that match pixels in the predetermined target image is greater than a threshold number of pixels.

23. The system of claim 19, wherein selectively providing the failure notification based upon the result of the comparison comprises:
providing the failure notification when the result of the comparison indicates that the visual content included in the generated test image of the webpage is not visually consistent with the predetermined target image of the visual content.

24. The system of claim 19, wherein selectively providing the failure notification comprises:
notifying the user to review the generated test image of the webpage, and
wherein the instructions that when executed by a client device cause the client device to perform operations further comprising:
receiving input specifying that the generated test image of the webpage is acceptable to the user; and
updating the predetermined target image of the visual content with a portion of the webpage that includes the visual content.

25. The system of claim 19, further comprising:
generating the predetermined target image of the visual content based on live data received from a live system.

26. The system of claim 19, wherein the predetermined target image of the visual content includes only the visual content without including other portions of the webpage.

27. The system of claim 19, wherein comparing the generated test image with a predetermined target image of the visual content comprises:
comparing pixels of the generated test image with pixels of the predetermined target image.

\* \* \* \* \*